3,158,434
VAT DYES AND DYEINGS WITH TETRAALKYL-BUTYNE DIOLS

Maurice H. Fleysher, Buffalo, N.Y., assignor to Allied Chemical Corporation, New York, N.Y., a corporation of New York
No Drawing. Filed June 22, 1961, Ser. No. 118,786
20 Claims. (Cl. 8—34)

This invention relates to vat dye paste compositions; that is, vat dye compositions in the form of pastes containing one or more vat dyes in the usual form of finely divided solid, unreduced dye particles dispersed in an aqueous medium. It relates more particularly to vat dye paste compositions which are particularly adapted for use in the continuous dyeing of fabrics in the piece by pigment padding processes, and especially by the pad/steam process.

An object of the present invention is to provide improved vat dye paste compositions and a method for the production thereof.

Another object of the present invention is to provide vat dye compositions for use in dyeing fabrics by pigment padding processes, and especially by the pad/steam process.

A further object of the present invention is to provide vat dye paste compositions which are non-migrating when applied to fabrics in the form of aqueous dispersions and then dried.

Another object of the present invention is to provide vat dye paste compositions, and especially vat dyes in the form of aqueous dye pastes, which are non-migrating when employed in dyeing fabrics by pigment padding processes, and especially by the pad/steam process.

Additional objects of the present invention are to provide a method of decreasing the migration of finely divided solid vat dye particles when applied to a fabric in the form of an aqueous suspension and then heated to remove water; and to provide improvements in the continuous dyeing of piece goods by pigment-padding processes, wherein the goods is padded with an aqueous suspension of finely divided particles of solid vat dye and then dried, whereby migration of the vat dye can be overcome.

Other objects of the invention will in part be obvious and will in part appear hereinafter.

In certain methods of dyeing textiles, such as the pigment padding processes, the textile material is padded or treated with an aqueous suspension or paste ("pad") containing a vat dye or a mixture of vat dyes in the form of finely divided particles and thereafter the particle-bearing material (referred to as the "padded" material) is subjected to vatting, oxidation, and finishing operations to complete fixation of the dye on the textile material. To obtain uniform distribution of dye particles on the textile surfaces required by such processes, the vat dye paste or suspension used in padding must be uniformly dispersed, fluid and penetrating. Further, the dye particles must be non-migrating once on the cloth. In the pad/steam process the vat dye particles are padded onto textile material which is then dried before passing into an aqueous reducing bath (e.g., containing sodium hydrosulfite) with subsequent development and fixation of the color by steam. In the intermediate drying step after padding the vat dye on the material, the residual water tends to move through the fabric under the influence of gravity or by capillary action. Some vat dye particles tend to be carried with this water and, depending on the extent of dye particle movement on the cloth, there is more or less noticeable color streaking or other defects. The migration of vat dye particles on the padded textile material appears to be due to the presence of highly dispersed dye particles and to be associated with their stability to precipitation by electrolytes, the more stable the dispersion the more drastic the migration of the dye particles when padded on the cloth and subsequently dried.

Pigment padding of textile materials is influenced by numerous factors which determine the success of the completed dyeing. The following generalizations can be made: (a) aggregation or agglomeration of vat dye particles causes specking, poor penetration and build-up of shade, especially on prolonged runs; (b) small particles ($5\mu$ or less) give smooth pads with good penetration, though the shades are weaker than the shades produced by larger sized particles; (c) small particles have a greater tendency to migrate than do larger particles; (d) small particles (less than $10\mu$) rarely cause specking, though high temperature and electrolytes will cause some agglomeration on standing; (e) conditions of drying the textile material after padding influence particle migration; (f) ionic dispersing agents added to the dye paste affect the smoothness of the pad (evenness of pigment distribution) due to either migration or specking; (g) dense particles are less subject to migration than light, "fluffy" particles.

Various attempts have been made to prevent or lessen the extent of migration of vat dye particles in dyeing by pigment padding processes.

Thus, in accordance with one proposal, a vegetable gum or thickening agent is added to the vat liquor or paste. This is disadvantageous because it requires an additional removal of the gum or thickening agent as well as adding to the cost of the process.

Another proposal is to add an anionic dispersing agent to the padding liquor to improve the dispersion of the vat dye particles. But anionic dispersants generally increase migration and, hence, their use must be strictly controlled.

It has also been proposed to add electrolytes such as sodium acetate, sodium bisulfite and the like to the padding liquor to counteract, to some degree, the action of the anionic dispersing agent normally present in the commercial vat dye pastes. The use of electrolytes must be very carefully controlled; otherwise some of the dispersed vat dye particles will agglomerate causing specking of the finally dyed material. To compensate for this difficulty, it has also been proposed to add a small amount of a hydrotropic agent, such as sodium xylene sulfonate, to the padding liquor to counteract the danger of specking from this cause.

All of these proposals are make-shifts, however, since they attempt to compensate for the primary cause of vat dye particle migration in such pigment padding processes, namely, the presence of anionic dispersing agents in the commercial vat dye pastes.

Most vat dyes are marketed in the form of concentrated aqueous pastes. Concentrated pastes are preferred to dilute pastes to minimize shipping and storage costs, whereas fluid pastes are preferred to more viscous pastes to avoid loss of costly color material. The paste should be stable; that is, not settle out on standing. To varying degrees, ordinary vat dyestuff pastes will gel, that is undergo a thixotropic reversal of fluidity on standing.

The known processes for preparing vat dye pastes involve precipitating a vat dye in an aqueous medium and recovering the preciptate in the form of a water-containing filter cake, which is then dispersed by mechanical working, usually in the presence of added dispersing agents. Some vat dyes are synthesized by processes in which the crude vat dye is isolated from the reaction medium in which it was formed, in the form of such a water-containing filter cake which may be directly dispersed and processed to a standardized vat dye paste.

Other vat dyes are synthesized by processes in which the crude vat dye is first isolated from a reaction medium containing an organic solvent or diluent which is separated by filtration or steam distillation.

Usually however the isolated vat dye is conditioned, and sometimes purified, by converting it into a water-containing filter cake by a so-called "acid-pasting" process, which involves dissolving the crude vat dye in concentrated sulfuric acid and adding the resulting solution to a relatively large excess of water, whereupon the vat dye precipitates from the diluted acid medium and is recovered by filtration. In certain processes, to effect a greater separation of the vat dye from associated impurities, the crude dye is first "vatted" (heated with an aqueous solution of caustic soda and sodium hydrosulfite) to convert the vat dye to an aqueous solution of the sodium salt of the leuco form of the vat dye which is sludge filtered to remove the non-vattable impurities, and the filtrate is then oxidized with air or other oxidant to insolubilize the dye, which on being filtered from the resultant slurry is obtained in the form of a water-containing filter cake.

The vat dyes contained in such "conditioned" filter cakes are chemically purer, more amenable to processing treatments for improving dispersibility, and often are more adherent to textile surfaces when "padded" thereon. Such water-containing filter cakes are the preferred starting material for the improved pastes of the present invention.

If the filter cakes contain larger amounts of water than desired in the final pastes, they may be concentrated in various known ways, e.g., by partial evaporation of the water content, before further processing. This makes possible the recovery of some vat dyes as pastes having a higher concentration of color solids than would otherwise be obtainable.

Besides isolating the precipitated vat dyes by filtration, it is possible (though not usual) to isolate them by settling the precipitate and decanting off the mother liquor or by subjecting the mixture to centrifuging and collecting the precipitate as a cake. The term "aqueous pulp" is employed herein in the broad sense to include generically vat dye precipitates isolated in any of these ways. For the conversion of the aqueous filter cakes or other aqueous pulps of vat dyes to commercial vat dye pastes, the filter cake or pulp is usually worked in admixture with an anionic dispersing agent and sufficient alkali to bring the pH of the resulting paste up to about 9.0. The dispersing agent most generally used is a condensation product of naphthalene sulfonic acid and formaldehyde in the form of the sodium salt and sold commercially as "Tamol N." Other dispersing agents employed for the purpose are aldehyde condensation products of naphthalene sulfonic acids, aldehyde condensation products of alkyl naphthalene sulfonic acids, lignin sulfonic acids, salts of lignin sulfonic acids, especially sodium salts and sulfite cellulose waste concentrates. Other chemicals are sometimes incorporated for particular purposes, as desired; for example, sugar, glycerine, diethylene glycol, triethanolamine, or the like, may be added to keep the paste from drying out and/or to assist in the subsequent use of the vat dye pastes.

Various methods and apparatus may be used to disperse the paste, including the types of apparatus described below. Thus, the mixture of aqueous vat dye pulp, anionic dispersing agent, and other material if added, may be salt-milled or sand-milled, or passed through a colloid mill, or through a "Micropulverizer"; or the vat dye paste may be circulated between the top and bottom of an agitated tank via a conduit line containing a centrifugal pump which forces the paste through screens prior to discharging into the top of the tank. Water is then added, if necessary, to adjust the color concentration of the paste to a standard value.

According to the present invention, the foregoing objects are accomplished and other benefits are secured by incorporating a small but effective amount of one, or a mixture of two or more, of a particular class of acetylenic ditertiary glycols set out more fully hereinafter into the aqueous vat dye pastes, as dispersing agents for the vat dye particles, or into the padding liquors or other aqueous vat dye suspensions prior to application of the latter to the fabric.

I have discovered that said particular class of acetylenic ditertiary glycols, namely, the water-soluble 1,1,4,4-tetra-alkyl-2-butyne-1,4-diols, possess a combination of properties which rendr them of particular value for use in the preparation of aqueous vat dye pastes and especially those which are to be employed as componetns of padding liquors in pigment-padding processes of dyeing fibrous materials with vat dyes. As employed herein and in the claims, the term "water-soluble" denotes a solubility in water at 20° C. of at least 0.1 part by weight per 100 parts by weight of water.

Thus I have discovered that said class of tetra-alkyl-butyne diols have dispersing properties which adapt them for use as substitutes, in whole or in part, for the anionic dispersing agents heretofore employed for the conversion of vat dye filter cakes and related aqueous vat dye pulps to aqueous vat dye pastes. I have discovered that said tetra-alkyl butyne diols exert a mild dispersing action on vat dyes in the form of aqueous filter cakes and related aqueous pumps obtained in the course of their manufacture, thereby making is possible, in some cases, to dispense with other dispersing agents and, in other cases, to employ much smaller amounts of the usual dispersing agents heretofore employed.

I have further discovered that the said water-soluble tetra-alkyl butyne diols have a beneficial action upon the properties of padding liquors employed in dyeing fabrics with vat dyes by pigment padding processes, whereby the vat dye particles have a greatly decreased tendency to migrate when fabrics padded with said padding liquors are heated to remove water. Thus I have found that the migration of finely-divided solid vat dye particles, upon drying of fabrics which have been padded or otherwise treated with aqueous suspensions of finely divided solid vat dyes, can be substantially eliminated (or at least decreased to a considerable extent) without adversely affecting the quality of the resulting dyeings, by incorporating one or more of said water-soluble tetraalkyl butyne diols into the padding liquor or other aqueous vat dye suspension prior to its application to the fabric. The cloth is evenly dyed, with no streaking, specking or darkening of the edges.

The class of 1,1,4,4-tetra-alkyl-2-butyne-1,4-diols employed in accordance with the present invention are known compounds having the formula

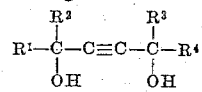

wherein $R^1$, $R^2$, $R^3$, and $R^4$ are alkyl groups which may be the same or different.

Inasmuch as some of the diols in which the alkyl groups represented by $R^1$, $R^2$, $R^3$ and $R^4$ are of substantial molecular weight are not water-soluble in the sense of the present invention (that is, they are not soluble to the extent of at least 0.1 part by weight per 100 parts by weight of water at 20° C.), the tetra-alkyl-butyne diols employed in accordance with the present invention are generally those in which at least two of said alkyl groups are lower alkyl groups (that is, containing 1 to 5 carbon atoms). Preferred diols are those in which at least one of each pair of alkyl groups in the 1- and 4-positions is a methyl group; namely, 1,4-dialkyl-1,4-dimethyl-2-butyne-1,4-diols.

Representative tetra-alkyl-butyne diols employed in accordance with the present invention are 1,1,4,4-tetramethyl-butyne-1,4-diol
1,1,4,4-tetraethyl-butyne-1,4-diol
1,4-diethyl-1,4-dimethyl-butyne-1,4-diol 1,4-dipropyl-1,4-dimethyl-butyne-1,4-diol
1,4-dibutyl-1,4-dimethyl-butyne-1,4-diol and mixtures of stereoisomers thereof. A number of these diols are sold commercially by Air Reduction Chemical and Carbide Company under the trademark "Surfynol" and are employed in the specific examples set out below. It is to be understood that, in the following description when the following "Surfynol products are referred to, the following tetra-alkyl-butyne-diols are intended:

"Surfynol 82": dimethyl-octyne-diol (1,4-diethyl-1,4-dimethyl-butyne-1,4-diol)

"Surfynol 102": dimethyl-decyne-diol (1,4-dipropyl-1,4-dimethyl-butyne-1,4-diol)

"Surfynol 104": 1,4-dibutyl-1,4-dimethyl-butyne-1,4-diol

The water-soluble tetra-alkyl-butyne-diols employed in accordance with the present invention can be incorporated into the aqueous vat dye compositions at any suitable time prior to their application to the fabric. Thus, if desired, they can be mixed with the other components employed for making the padding liquor in the dyehouse, proper allowance being made for the nature, constitution and influence upon migration of the vat dye particles of the other components. In the interest of maximum efficiency, simplicity of operation and convenience, the said diols are preferably incorporated into the vat dye pastes in the course of the manufacture of the latter. In this way, advantage is taken of the dispersing effect of said diols on the vat dyes, and the specific proportion of diol employed can be correlated with the particular vat dye so as to secure optimum non-migrating effect while avoiding separate formulation in the dye house.

Thus, in accordance with the preferred method of the present invention, small amounts of one or a mixture of water-soluble tetra-alkyl-butyne-diols are intimately mixed with the vat dye during the course of preparation of the final commercial aqueous vat dye pastes or suspensions from aqueous filter-cakes or other aqueous pulps thereof. For example, a small amount of the tetra-alkyl-butyne-diol is stirred with an aqueous vat dye filter cake as obtained in the course of manufacture of the vat dye until a thin, fluid paste is produced.

The amount of tetra-alkyl-butyne-diol employed in accordance with the present invention is at least 1% of the weight of the dye solids in the aqueous vat dye composition (aqueous filter cake or related pulp, vat dye paste, or padding liquor). In general, amounts greater than 5% of the weight of the dye solids is not required, although greater amounts can be employed; for example, up to 10% of the weight of the vat dye solids in the aqeous compositions. Ordinarily, the upper limit on the amount of diol employed is determined by the solubility in water of the particular diol; in general the said diols are solids at ordinary temperatures, having limited solubility in water.

In some cases, the particular tetra-alkyl-butyne-diol employed in connection with a particular vat dye filter cake or other pulp may not be sufficiently effective to completely disperse the vat dye particles into an aqueous paste of the desired fluidity at the desired vat dye concentration, owing to the limited solubility of the diol, and/or the nature of the vat dye, and/or the other components present in the composition. This can be readily overcome in accordance with the present invention by the incorporation into the composition of a small amount (preferably not more than 0.5% of the weight of the vat dye) of one of the anionic dispersing agents heretofore employed, such as any of those referred to above. It is a feature of the present invention that the amount of supplemental anionic dispersing agent required to impart the desired fluidity to the aqueous vat dye pastes containing the said tetra-alkyl-butyne-diols is only a fraction of that heretofore employed to produce vat dye pastes of said concentration and fluidity. As a result, objectionable migration if any of vat dye particles upon use of such pastes in such dyeing processes as the pad/steam process is greatly reduced, and if encountered can be further inhibited or even eliminated by the inclusion in the pad liquor of a small amount of an electrolyte of the type of alkali metal acetates (e.g., sodium acetate) and alkali metal bisulfites which tend to overcome the ionic effect of the anionic dispersing agents. The use of the smaller amounts of the usual dispersing agents provides an additional benefit, insofar as migration of the vat dye particles is concerned, owing to the fact that the dispersing agents in common use (such as, "Tamol N," sulfite waste liquor, and similar anionic dispersing agents) tend to promote migration by their solvating and ionic action.

An outstanding advantage of said class of tetra-alkyl-butyne-diols is their ability to render vat dye pastes fluid without increasing substantially the tendency of finely divided solid vat dye particles to migrate when employed for dyeing textile fabrics by pigment-padding processes wherein the fabric is padded with an aqueous dispersion of the finely divided solid vat dye and then dried. Since they are non-ionic substances, they do not impart any adverse ionic effect to the aqueous dispersions.

After mixing the aqueous pulp of the vat dye with the water-soluble tetra-alkyl-butyne-diol (and anionic dispersing agent, if employed), the mixture is subjected to the usual grinding or milling treatment to obtain uniformity of dispersion and desired particle size. Preferably the mixture is subjected to sand-grinding since a greater degree of uniformity of particle size (fewer fines) is thereby obtained. If desired, however, the mixture may be ground in a mill of the "Kady" type, described in U.S. Patents 2,628,081 and 2,706,621 and comprising centrally disposed rotor discs having pitched planar surfaces which project slurry laterally against a cylindrical annular baffle containing spaced vertical slots, or by passing it through a Manton-Gaulin pump under high pressure, or by salt-grinding.

In general, vat dye pastes of the present invention may contain 10 to 30 parts of dye solids; a total of 0.1 to 2 parts of tetra-alkyl-butyne-diol and anionic dispersing agent (if present), preferably a maximum of 0.5 part being anionic dispersing agent but no more than 2% of such anionic dispersing agent based on weight of vat dye should be used; 0 to 20 parts of sugar and/or other additives; and the remainder (approximately 50 to approximately 90 parts) of water, per 100 parts of vat dye paste, all by weight.

In order to evaluate the extent of migration of vat dye particles which results from the use of various vat dye padding liquors in dyeing textile fabrics by pigment padding process, comparative tests are carried out as follows:

A sample of the aqueous vat dye paste to be tested is diluted with water to a dye solids concentration of 0.3% by weight. Strips of white cotton cloth (broadcloth and/or twill) are passed through the resulting suspension, excess water is removed by wringing, and the fabric is subjected to an air stream which favors drying on one side and in one particular area. The dried dye-laden cloth is then subjected to the normal vatting, oxidation and finishing operations of the pad/steam dyeing process. The extent of migration of vat dye particles, if any, is evaluated by visual observation and is rated on the following scale of increased migration:

None
Very slight
Slight
Appreciable
Considerable
Much

The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

A vat dye paste was prepared from a vat dye filter cake which contained 17% of dye solids, and which had been obtained by the process of U.S.P. 2,232,700, Example 2, by stirring the filter cake with the following substances in the following proportions:

| | Parts |
|---|---|
| Filter cake | 7,000 |
| Cane sugar | 1,000 |
| 50% aqueous sodium hydroxide | 14 |
| Trichlorophenol (as preservative) | 24 |
| "Tamol N" | 28 |
| Acetylenic ditertiary glycol ("Surfynol 102") | 25 |

The resulting vat dye paste was concentrated by evaporation of water to a weight of 7000 parts by heating at 70° to 75° while drawing air over the paste, and then cooled to room temperature. It was then subjected to sand-milling with 20/30 mesh Ottawa sand in a continuous sand mill in which the ratio of sand to vat dye paste by weight was 3:1. The resulting dye paste was fluid and only slightly thixotropic after standing for a day.

Strips of cotton broadcloth and cotton twill were subjected to migration tests as described above with the resulting vat dye paste, employing sodium acetate (0.6 oz. per gal.) in the padding liquor. The resulting paste showed substantially no migration of vat dye particles on both fabrics. When employed for dyeing cotton cloth by the usual pad/steam method, the cloth was dyed evenly, with no streaking, specking, or darkening of the edges.

For purposes of comparison, a standard commercial vat dye paste containing 17% of vat dye solids, and obtained from a similar filter cake of said vat dye by dispersing the filter cake with 56 parts of "Tamol N" per 7,000 parts of vat dye paste was subjected to similar migration tests. There was much migration of vat dye particles on both fabrics.

*Example 2*

Two vat dye pastes (A and B) were prepared from an aqueous filter cake of Carbanthrene Olive T (C.I. Vat Black 25—New Colour Index 69525) which contained 14.2% of dye solids and which had been obtained by the known process involving alcoholic caustic potash fusion of dianthraquinonylamino-benzanthrone, addition of the fusion mass to an excess of water, aeration to oxidize the leuco compound, filtration, acid-pasting of the dried crude filter cake by dissolving it in sulfuric acid containing some boric acid and adding the resulting solution to an excess of water, filtration, and washing of the so-obtained filter cake with dilute ammonium hydroxide solution to remove impurities. The preparation was carried out by stirring the aqueous filter cake with the following substances in the following proportions:

| | A (Parts) | B (Parts) |
|---|---|---|
| Carbanthrene Olive T filter cake | 583 | 583 |
| Cane sugar | 72 | 72 |
| Trichlorophenol (preservative) | 1.4 | 1.4 |
| "Tamol N" | 1.4 | 14 |
| Acetylenic ditertiary glycol ("surfynol 102") | 1.4 | |
| 50% aqueous sodium hydroxide | 0.15 | 0.15 |

The resulting vat dye pastes were concentrated by evaporation of water to a weight of 483 parts, by heating at 70° to 75° while drawing air over the pastes, and then cooled to room temperature. They were then milled for 1 to 2 hours with 20/30 mesh Ottawa sand (200 parts) and the sand was removed by passing the pastes through a 200-mesh screen. The resulting dye pastes were fluid and only slightly thixotropic after standing for a day.

Migration tests as described above were carried out with the resulting vat dye pastes on strips of cotton twill.

Paste A showed only slight migration of vat dye particles when padded "as is." The addition of a small amount of sodium acetate (0.6 oz. per gal.) to the padding liquor resulted in no migration of the vat dye particles.

Paste B exhibited considerable migration of vat dye particles when padded "as is," and the addition of sodium acetate (0.6 oz. per gal.) to the padding liquor decreased the extent of migration of the vat dye particles only slightly.

*Example 3*

Two vat dye pastes (A and B) were prepared from a filter cake of Carbanthrene Olive T which contained 19.8% of dye solids and which had been obtained by a modification of the process referred to above in Example 2 involving a further extraction of the filter cake employed in Example 1 with dilute hydrochloric acid (500 parts of 20° Bé. hydrochloric acid in 5,000 parts of water), filtration and washing with water. The preparation was carried out by stirring the aqueous filter cake with the following substances in the following proportions:

| | A (Parts) | B (Parts) |
|---|---|---|
| Carbanthrene Olive T filter cake | 400 | 400 |
| Water | 80 | 80 |
| "Tamol N" | 1 | 9.6 |
| Acetylenic ditertiary glycol ("Surfynol 102") | 2 | |
| 50% aqueous sodium hydroxide | 0.08 | 0.08 |

The resulting vat dye pastes were milled for 1 to 2 hours with 20/30 mesh Ottawa sand (400 parts) and the sand was removed by passing the pastes through a 200-mesh screen. The resulting dye pastes were fluid.

Migration tests as described above were carried out with the resulting vat dye pastes on strips of cotton broadcloth and cotton twill.

Paste A showed only slight migration of vat dye particles on both cloths when padded "as is," and the migration was completely suppressed by the addition of sodium acetate (1 oz. per gal.) to the padding liquor.

Paste B exhibited considerable migration of vat dye particles on both cloths when padded "as is," and the addition of sodium acetate (1 oz. per gal.) to the padding liquor decreased the extent of migration of the vat dye particles slightly.

*Example 4*

Two vat dye pastes (A and B) were prepared from a filter cake of Carbanthrene Olive R (C.I. Vat Black 27—New Colour Index 69005) which contained 30% of dye solids and which had been obtained by the known process involving benzoylation of 4,4'-diamino-1,1'-dianthrimide in cold oleum followed by carbazolization, drowning of the reaction mass and isolating of the product by filtration and washing of the filter cake until free of acid. The preparation was carried out by stirring the aqueous filter cake with the following substances in the following proportions:

| | A (Parts) | B (Parts) |
|---|---|---|
| Carbanthrene Olive R filter cake | 317 | 317 |
| Cane sugar | 70 | 70 |
| Trichlorophenol | 1.0 | 1.0 |
| "Tamol N" | 1.0 | 10 |
| Acetylenic ditertiary glycol ("Surfynol 102") | 1.0 | |
| 50% aqueous sodium hydroxide | 0.15 | 0.15 |

The resulting vat dye pastes were concentrated to a weight of 352 parts by heating the mixture at 70° to 75° while drawing air over the pastes and then cooled to room temperature. They were then milled for 3 hours with 20/30 mesh Ottawa sand (200 parts) and the sand was removed by passing the pastes through a 200-mesh screen. The resulting dye pastes were fluid and did not settle or set upon standing. There were no differences in filterability and dispersibility of pastes A and B. When employed for dyeing by pigment-pad processes, paste A gave a slightly more complete color exhaust than paste B.

Migration tests as described above were carried out with the resulting vat dye pastes on strips of cotton twill.

Paste A showed appreciable migration of vat dye particles when padded "as is." The addition of a small amount of sodium acetate (0.6 oz. per gal.) to the padding liquor resulted in very slight migration of the vat dye particles.

Paste B exhibited considerable migration of vat dye particles when padded "as is," and the addition of sodium acetate (0.6 oz. per gal.) to the padding liquor resulted in no decrease in the extent of migration of the vat dye particles.

Example 5

Two vat dye pastes (A and B) were prepared from an aqueous filter cake of Carbanthrene Black BF (a mixture of aminodibenzanthrone—New Colour Index 59850) which contained 17.7% of dye solids and which had been obtained by the known process involving nitration of dibenzanthrone followed by reduction. The preparation was carried out by stirring the aqueous filter cake with the following substances in the following proportions:

| | A (Parts) | B (Parts) |
|---|---|---|
| Carbanthrene Black BF filter cake | 565 | 565 |
| Cane sugar | 75 | 75 |
| Acetylenic ditertiary glycol ("Surfynol 102") | 1.5 | |
| "Tamol N" | | 5 |
| 50% aqueous sodium hydroxide | 0.15–0.3 | 0.15–0.3 |
| Trichlorophenol | 1.5 | 1.5 |

The resulting vat dye pastes were concentrated by evaporation of water to a weight of 500 parts, by heating at 70° to 75° while drawing air over the pastes, and then cooled to room temperature. They were milled for 1¾ hours with 20/30 mesh Ottawa sand (200 parts) and the sand was removed by passing the pastes through a 200-mesh screen.

Paste A had a tendency to set up slightly after standing for three days, but became fluid upon light agitation.

Migration tests as described above were carried out with the resulting vat dye pastes on strips of cotton twill.

Paste A showed appreciable migration of vat dye particles when padded "as is"; but the addition of sodium acetate (1 oz. per gal.) to the padding liquor resulted in no migration of the vat dye particles.

Paste B exhibited much migration of vat dye particles when padded "as is." While the addition of sodium acetate (1 oz. per gal.) to the padding liquor decreased the extent of migration of vat dye particles, it was still appreciable.

Instead of cane sugar an equal amount of glycerine can be employed.

Example 6

Part 1.—A vat dye paste was prepared from an aqueous filter cake of Carbanthrene Violet BNX (C.I. Vat Violet 13—New Colour Index 68700) which contained 17.9% of dye solids and which had been obtained by the known process involving ring-closure of 1,5-dianthraquinonyl-amino-anthraquinone with 100% sulfuric acid in two stages, drowning the reaction mixture in an excess of water, filtering the precipitate, reslurrying the filter cake in dilute sodium hydroxide, filtering, and washing the filter cake free of alkali. The preparation was carried out by stirring 500 parts of the aqueous filter cake with 4 parts of acetylenic ditertiary glycol ("Surfynol 102") to form a fluid paste, which was made alkaline with aqueous sodium carbonate (1 part in 160 parts of water). The resulting vat dye paste was milled for 10 hours with 20/30 mesh Ottawa sand (125 parts) and the sand was removed by passing the paste through a 200-mesh screen. The resulting dye paste was fluid and did not settle or set upon standing.

Part 2.—Another vat dye paste was prepared by stirring the aqueous filter cake with sufficient "Tamol N" to provide a final vat dye paste containing 1 to 1.5% of "Tamol N" (5 to 7.5 parts of "Tamol N" per 500 parts of paste), diluting the resulting fluid paste to a dye solids content of about 14%, screening the resulting fluid paste through a 300-mesh screen, and adjusting the alkalinity of the resulting vat dye paste to between pH 8 and pH 10 by addition of aqueous sodium hydroxide.

Migration tests as described above were carried out with the resulting vat dye pastes on strips of cotton twill and cotton broadcloth.

The vat dye paste of Part 1 showed only slight migration of vat dye particles on cotton twill and no migration on the broadcloth.

The vat dye paste of Part 2 showed considerable migration of vat dye particles on the cotton twill and slight migration on the broadcloth.

Example 7

Part 1.—A vat dye paste was prepared from an aqueous filter cake of Carbanthrene Brown AR (C.I. Vat Brown 3—New Colour Index 69015) which contained 21.8% of dye solids and which had been obtained by the known process involving reaction of 4,5'-dibenzamido-1,1'-dianthrimide with concentrated sulfuric acid followed by oxidation with bichromate, dilution of the reaction mixture with water, filtering the precipitate, and washing the filter cake acid-free. The preparation was carried out by stirring 500 parts of the aqueous filter cake with 3 parts of acetylenic ditertiary glycol ("Surfynol 102") and 3 parts of "Tamol N" to form a fluid paste. The resulting vat dye paste was milled for 18 hours with 20/30 mesh Ottawa sand (150 parts) and the sand was removed by passing the paste through a 200-mesh screen.

Part 2.—Another vat dye paste was prepared by stirring the aqueous filter cake with sufficient "Tamol N" to provide a final vat dye paste containing about 2% of "Tamol N" (10 parts of "Tamol N" per 500 parts of paste) forming a fluid dispersion by circulating the resulting paste through a centrifugal pump of the Manton-Gaulin type.

Migration tests as described above were carried out with the resulting vat dye pastes on strips of cotton twill and cotton broadcloth, both with and without the addition of sodium acetate (1 oz. per gal.) to the padding liquor.

The vat dye paste of Part 1 showed only slight migration of vat dye particles on cotton twill, which was completely overcome by the addition of sodium acetate. There was no migration on the broadcloth.

The vat dye paste of Part 2 showed considerable migration of vat dye particles on both the cotton twill and broadcloth; and the addition of sodium acetate produced no improvement.

Example 8

Four vat dye pastes (A, B, C and D) were prepared from a filter cake of the vat dye of U.S.P. 1,957,459, Example 11, which contained 28% of dye solids and which had been obtained by the known process involving fusion of 6,6'-diamino-Bz-Bz'-dibenzanthronyl in isopropyl alcoholic potassium hydroxide, drowning of the fusion mass in water, completion of vatting of the dye by addition of sodium hydrosulfite, filtration of the leuco solution to remove non-vatted impurities, addition of sodium bicarbonate to the filtrate to reduce the alkalinity, aeration to oxidize the leuco compound to the vat dye, filtering off the vat dye, washing the filter cake alkali-free with water, and blowing with air to remove a part of the water. The preparation was carried out by stirring the aqueous filter cake with the following substances in the following proportions:

|  | A (Parts) | B (Parts) | C (Parts) | D (Parts) |
|---|---|---|---|---|
| Vat Dye filter cake | 200 | 200 | 200 | 200 |
| Water | 80 | 80 | 80 | 80 |
| Acetylenic ditertiary glycol | [1] 0.8 | [2] 0.8 | [3] 0.8 | |
| "Tamol N" | | | | 2 |

[1] "Surfynol 82" (dimethyl-octyne-diol).
[2] 2,5-dimethyl-3-hexyne-2,5-diol.
[3] "Surfynol 104."

The resulting vat dye pastes were milled for one hour with 20/30 mesh Ottawa sand (200 parts) and the sand was removed by passing the pastes through a 200-mesh screen.

Migration tests as described above were carried out with the resulting vat dye pastes on strips of cotton twill, with and without the addition of sodium acetate (0.6 oz. per gal.) to the padding liquor.

The results are set out in the following table:

TABLE

| Vat Dye Paste | Migration As Is | Migration with Sodium Acetate added to Pad Liquor |
|---|---|---|
| A | Considerable | Nil. |
| B | do | Do. |
| C | do | Do. |
| D | do | Slight to appreciable. |

*Example 9*

Cotton cloth was padded with a padding liquor prepared by slurrying 4 ounces of a commercial vat dye paste of Carbanthrene Violet BNX (C.I. Vat Violet 13—New Colour Index 68700) in 120 ounces of water to which 0.02 ounce of "Surfynol 102" had been added. Then 0.6 ounce of sodium acetate and sufficient water were added to make one gallon of padding liquor. The vat dye paste had the following composition:

13.8% vat dye solids
0.15% "Tamol N"
15.0% cane sugar
0.4% trichlorophenol
0.1% sodium hydroxide
70.55% water The resulting cloth showed substantially no migration of vat dye particles when subjected to drying; and when further subjected to reduction and development of the dyeing gave a dyed cloth which was uniformly dyed and was free from streaking and specking.

I claim:

1. A method of producing a vat dye paste of a water-insoluble vat dye in which the vat dye is in the form of finely divided solid particles in an aqueous medium which comprises mixing a small amount of a water-soluble 1,4-dialkyl-1,4-dimethyl-butyne-1,4-diol with an aqueous filter cake of a vat dye which has been produced by precipitation of the vat dye from an aqueous medium followed by separation of the precipitate by filtration, the amount of said diol being 1 to 10 parts per 100 parts of vat dye, by weight, whereby migration of the particles of the vat dye is inhibited when the resulting paste is applied to a fabric in the form of an aqueous suspension and then heated to remove water.

2. A method of producing a vat dye paste as defined in claim 1 wherein the diol is a water-soluble 1,4-di-lower alkyl-1,4-dimethyl-butyne-1,4-diol.

3. A method of producing a vat dye paste as defined in claim 2 wherein the aqueous filter cake contains 10 to 30 percent by weight of dye solids and the amount of the diol is 1 to 5 parts per 100 parts of vat dye, by weight.

4. A method of reducing the tendency of a finely divided solid vat dye to migrate when applied to a fabric in the form of an aqueous suspension and then heated to remove water, which comprises incorporating a small amount of a water-soluble 1,1,4,4-tetraalkyl-butyne-1,4-diol into the aqueous vat dye suspension prior to its application to the fabric, the amount of said diol being at least 1 part per 100 parts of vat dye, by weight.

5. A method as defined in claim 4 wherein the diol is a 1,4-di-lower alkyl-1,4-dimethyl-butyne-1,4-diol.

6. In the method of dyeing a textile fabric by a process wherein the fabric is padded with an aqueous suspension of particles of a solid vat dye and then heated to remove water, the improvement which comprises padding the fabric with an aqueous suspension of particles of finely divided solid vat dye containing in solution a water-soluble 1,1,4,4-tetraalkyl-butyne-1,4-diol in an amount at least equal to 1% of the weight of the solid vat dye, whereby the tendency of the particles of solid vat dye to migrate during the heating is reduced.

7. In the method of dyeing a textile fabric by a process wherein the fabric is padded with an aqueous suspension of particles of a solid vat dye and then dried, the improvement which comprises padding the fabric with an aqueous suspension of particles of finely divided solid vat dye containing in solution a water-soluble 1,4-dialkyl-1,4-dimethyl-butyne-1,4-diol in an amount equal to 1% to 10% of the weight of the solid vat dye, whereby the tendency of the particles of solid vat dye to migrate during the drying is reduced.

8. A process as defined in claim 7 wherein the aqueous suspension of vat dye particles also contains an alkali metal acetate.

9. The improvement in the method of dyeing defined in claim 7 wherein the diol is a water-soluble 1,4-dialkyl-1,4-dimethyl-butyne-1,4-diol in which each of the alkyl groups contain 2 to 4 carbon atoms and is present in an amount equal to 1% to 10% of the weight of the solid vat dye together with an anionic dispersing agent in an amount not exceeding 2% of the weight of the solid vat dye.

10. A vat dye composition containing a mixture of
(a) a water-insoluble vat dye in the form of finely divided solid particles in an aqueous medium, and
(b) as an inhibitor of migration of said particles when said mixture is applied to a fabric and then heated to remove water, a small amount of a water-soluble 1,1,4,4-tetraalkyl-butyne-1,4-diol, the amount of said diol being at least 1 part per 100 parts of vat dye, by weight.

11. A vat dye composition containing a mixture of
(a) a water-insoluble vat dye in the form of finely divided solid particles suspended in an aqueous medium, and
(b) as an inhibitor of migration of said particles when the suspension is applied to a fabric and then heated to remove water and as a dispersing agent for said particles, a small amount of a water-soluble 1,1,4,4-tetraalkyl-butyne-1,4-diol, the amount of said diol being 1 to 10 parts per 100 parts of vat dye, by weight.

12. A vat dye paste comprising essentially
(a) an aqueous dispersion of finely divided solid particles of a water-insoluble vat dye, which particles tend to migrate when the suspension is applied to a fabric and then heated to remove water, and
(b) as an inhibitor of such migration, 1 to 5%, based on the weight of the vat dye, of a water-soluble 1,1,4,4-tetraalkyl-butyne-1,4-diol.

13. A vat dye paste as defined in claim 12 wherein the diol is a water-soluble 1,4-dialkyl-1,4-dimethyl-butyne-1,4-diol.

14. A vat dye paste as defined in claim 13 wherein the said 1,4-alkyl groups of the diol each contain 2 to 4 carbon atoms.

15. A vat dye paste as defined in claim 12 wherein the diol is a 1,4-di-lower alkyl-1,4-dimethyl-butyne-1,4-diol.

16. A vat dye paste comprising essentially finely divided solid particles of a water-insoluble vat dye dispersed in an aqueous medium by a small amount of dispersing agent, said vat dye particles constituting 10 to 30 parts, water constituting about 90 to about 50 parts, and said dispersing agent constituting 0.1 to 2 parts, per 100 parts by weight of the paste, said dispersing agent being selected from the group consisting of (a) water-soluble 1,4-di-lower alkyl-1,4-dimethyl-butyne-1,4-diols and (b) admixtures of said diols with anionic dispersing agents in which the amount of anionic dispersing agent does not exceed 0.5 part, per 100 parts by weight of the paste, and does not exceed 2% of the weight of the vat dye.

17. A vat dye paste as defined in claim 12 and containing an anionic dispersing agent in an amount not exceeding 2% of the weight of the vat dye.

18. A vat dye paste as defined in claim 17 wherein the diol is a 1,4-di-lower alkyl-1,4-dimethyl-butyne-1,4-diol.

19. A vat dye paste as defined in claim 17 and containing an anionic dispersing agent, wherein, per 100 parts by weight of the paste, the vat dye constitutes 10 to 30 parts, the diol is a 1,4-dialkyl-1,4-dimethyl-btuyne-diol in which each of the alkyl groups contains 2 to 4 carbon atoms and the anionic dispersing agent constitutes at most 0.5 part.

20. A method of producing a vat dye paste of a water-insoluble vat dye in which the vat dye is in the form of finely divided solid particles in an aqueous medium, which comprises mixing a small amount of a water-soluble 1,1,-4,4-tetraalkyl-butyne-1,4-diol with an aqueous pulp of a vat dye which has been produced by precipitation of the vat dye from an aqueous medium followed by separation of the precipitate, the amount of said diol being at least 1% of the weight of the water-insoluble vat dye, whereby migration of the particles of vat dye is inhibited when the resulting paste is applied to a fabric in the form of an aqueous suspension and then heated to remove water.

References Cited in the file of this patent
UNITED STATES PATENTS

| | | |
|---|---|---|
| 1,957,459 | Howell | May 8, 1934 |
| 2,232,700 | Fleysher | Feb. 25, 1941 |
| 2,926,987 | Freyermuth et al. | Mar. 1, 1960 |
| 2,997,447 | Russell et al. | Aug. 22, 1961 |
| 3,051,541 | Clapp | Aug. 28, 1962 |

OTHER REFERENCES

Jacoby: The Application of Vat Dyes, 1953, by the A.A.T.C.C., Lowell, Mass., pages 204–209 and 251–256.

Air Reduction Chemical Co. Technical Bulletin NPD–080507, The Surfynols, pages 1, 2, 16, and 17 relied on (22 pages). AIRCO, 150 East 42nd St., New York (1956).

Brauer: Melliand Textile Berichte, vol. 41, 1960, pages 1102–1109. (Translation of Brauer's articles is in 8–34, 19 pages.)